United States Patent
Shin et al.

(10) Patent No.: US 9,977,954 B2
(45) Date of Patent: May 22, 2018

(54) ROBOT CLEANER AND METHOD FOR CONTROLLING A ROBOT CLEANER

(71) Applicant: LG Electronics Inc., Seoul (KR)

(72) Inventors: Yongmin Shin, Seoul (KR); Kyungmin Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 14/794,972

(22) Filed: Jul. 9, 2015

(65) Prior Publication Data

US 2016/0154996 A1    Jun. 2, 2016

(30) Foreign Application Priority Data

Dec. 1, 2014 (KR) .................. 10-2014-0169726

(51) Int. Cl.
*G06K 9/00* (2006.01)
*A47L 9/28* (2006.01)
(Continued)

(52) U.S. Cl.
CPC ........ *G06K 9/00355* (2013.01); *A47L 9/2852* (2013.01); *A47L 9/2857* (2013.01);
(Continued)

(58) Field of Classification Search
None
See application file for complete search history.

(56) References Cited

U.S. PATENT DOCUMENTS

| 2011/0001813 | A1* | 1/2011 | Kim | G06K 9/00355 348/77 |
| 2014/0156076 | A1* | 6/2014 | Jeong | B25J 9/0003 700/257 |

(Continued)

FOREIGN PATENT DOCUMENTS

| KR | 10-2011-0003146 | 1/2011 |
| KR | 10-2012-0116278 | 10/2012 |

(Continued)

OTHER PUBLICATIONS

Korean Office Action dated Oct. 30, 2015.

*Primary Examiner* — Matthew Bella
*Assistant Examiner* — Brian Shin
(74) *Attorney, Agent, or Firm* — KED & Associates LLP

(57) ABSTRACT

A robot cleaner and a method for controlling a robot cleaner are provided. The robot cleaner may include a casing, a drive disposed in the casing, a camera disposed in the casing to acquire an image of a user's gesture, and a controller that extracts an image including a user's arm image from the image acquired by the camera to determine an angle and a direction of the arm expressed by the user's gesture from the arm image and determine an intension expressed by the determined arm angle, and controls the drive based on the determined intension. The method may include receiving a voice command through a voice recognition device disposed in the robot cleaner; determining, by a controller, whether the received voice command is a gesture recognition command; acquiring an image of a user's gesture by a camera, when the received voice command is the gesture recognition command; determining, by the controller, an angle and direction of an arm expressed by the user's gesture from the image acquired by the camera; and determining, by the controller, a function intended by the determined arm angle to control a movement device so as to execute the determined function.

20 Claims, 8 Drawing Sheets

(51) Int. Cl.
*G06F 3/16* (2006.01)
*G05D 1/00* (2006.01)
*A47L 11/40* (2006.01)

(52) U.S. Cl.
CPC ........ *A47L 11/4011* (2013.01); *G05D 1/0016* (2013.01); *G06F 3/167* (2013.01); *A47L 2201/04* (2013.01); *G05D 2201/0203* (2013.01); *Y10S 901/01* (2013.01)

(56) References Cited

U.S. PATENT DOCUMENTS

| | | | |
|---|---|---|---|
| 2014/0371909 A1* | 12/2014 | Lee | G05D 1/0016 700/259 |
| 2015/0032260 A1* | 1/2015 | Yoon | A47L 9/2857 700/257 |

FOREIGN PATENT DOCUMENTS

| KR | 10-1385981 | 4/2014 |
|---|---|---|
| KR | 10-1428877 | 8/2014 |

\* cited by examiner

500
ROBOT CLEANER AND METHOD FOR CONTROLLING A ROBOT CLEANER

CROSS-REFERENCE TO RELATED APPLICATION(S)

The present application claims priority under 35 U.S.C. 119 and 35 U.S.C. 365 to Korean Patent Application No. 10-2014-0169726, filed in Korea on Dec. 1, 2014, which is hereby incorporated by reference in its entirety.

BACKGROUND

1. Field

A robot cleaner and a method of controlling a robot cleaner are disclosed herein.

2. Background

In general, robot cleaners refer to devices for automatically cleaning an area to be cleaned by suctioning foreign substances, such as dust, from a floor while traveling in the area to be cleaned by itself without a user's manipulation. Recently, technologies in which the robot cleaner recognizes a user's gesture or voice command and moves on the basis of the recognized command are being developed.

A related art is entitled "robot cleaner having gesture recognition function and method of controlling the same" is disclosed in Korean Patent Registration Gazette No. 1385981, having a registration date of Apr. 10, 2014, which is hereby incorporated by reference. In the related art, a technology in which optical flow analysis and skin color detection are performed in real time to recognize a user's gesture is disclosed.

However, according to the related art, as the optical flow analysis and the skin color detection are performed in real time, a gesture detection algorithm has to be continuously performed inside the robot cleaner. This requires a lot of resources for an embedded system, such as a robot cleaner. Also, even though a user does not make a gesture for the purpose of inputting a command, the robot cleaner may detect the user's gesture.

BRIEF DESCRIPTION OF THE DRAWINGS

Embodiments will be described in detail with reference to the following drawings in which like reference numerals refer to like elements, and wherein.

DETAILED DESCRIPTION

Figure 1:
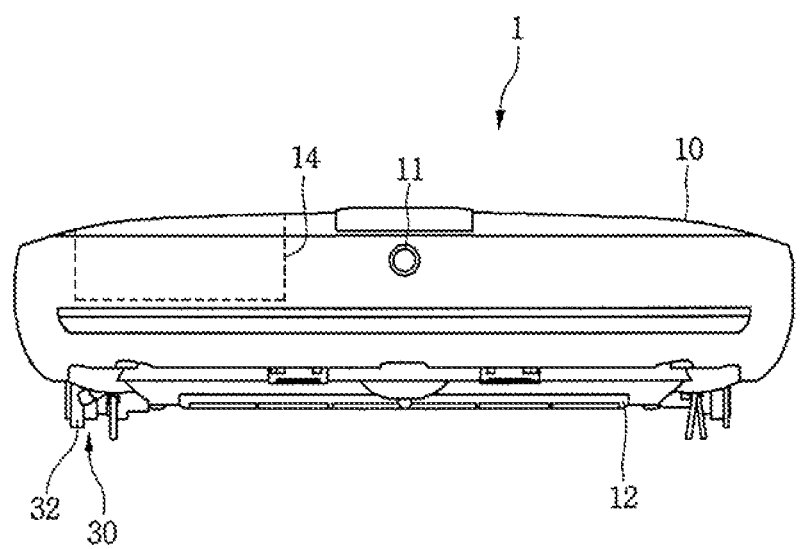
FIG. 1 is a front view of a robot cleaner according to an embodiment.

Reference will now be made in detail to embodiments disclosure, examples of which are illustrated in the accompanying drawings. Wherever possible, like reference numerals have been used to indicate like elements, and repetitive disclosed has been omitted.

In the following detailed description of embodiments, reference is made to the accompanying drawings that form a part hereof, and in which is shown by way of illustration embodiments which may be practiced. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense.

Figure 2:
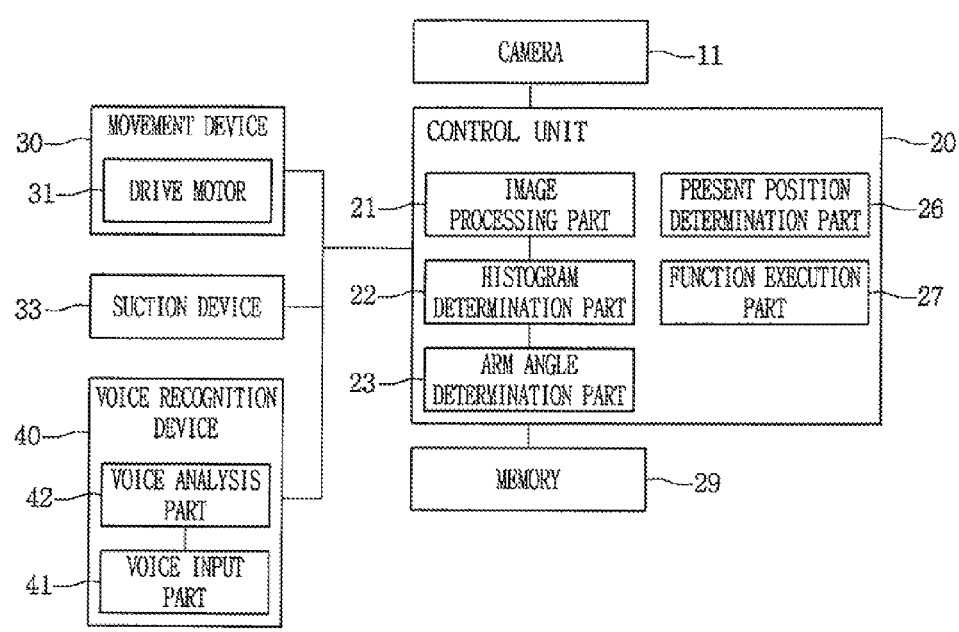
FIG. 2 is a block diagram of the robot cleaner according to an embodiment.

FIG. 1 is a front view of a robot cleaner according to an embodiment. FIG. 2 is a block diagram of the robot cleaner according to an embodiment.

Referring to FIGS. 1 and 2, a robot cleaner 1 according to an embodiment may include a casing 10 that defines an outer appearance of the robot cleaner. Although the casing 10 is not limited to a shape thereof, the casing 10 may have a circular shape or a polygonal shape having a rounded edge, for example.

The robot cleaner 1 may further include a movement device 30 to move the casing 10. The movement device 30 may include a plurality of wheels 32 that contacts a ground surface, and a plurality of drive motors 31 that drive each of the plurality of wheels 32, respectively.

The robot cleaner 1 may further include a suction device 33 that generates a suction force. A suction hole 12 may be defined in a lower portion of the casing 10, and a dust container 14 to store dust separated from suctioned air may be disposed at one side of the casing 10.

The robot cleaner 1 may further include a camera 11 that is capable of acquiring an image. The camera 11 may acquire a black and white image. Of course, the camera 11 may acquire a color image having a high quality.

For example, the camera 11 may be disposed on a front surface of the casing 10. The camera 11 may be inclined upward so that the camera 11 may acquire an image of a user's arm. That is, as a position of the user's arm may be disposed higher than a position of the robot cleaner 1, the camera 11 may be inclined upward to acquire the image of the user's arm. Of course, according to an angle of view of the camera 11, the image of the user's arm may be acquired even if the camera 11 is not inclined upward.

The robot cleaner 1 may further include a control unit or controller 20 that recognizes n angle of the arm (hereinafter, referred to as an "arm angle") expressed by the user from the image photographed by the camera 11 using an arm angle determination algorithm and a memory 29 that stores information.

The arm angle extracted from the control unit 20 may be an arm angle expressed by the user's gesture, not a real angle of the user's arm in the arm image. That is, the arm angle expressed by the user may be different according to a relative position of the user and the robot cleaner. Thus, the arm angle of the user in the image acquired by the camera 11 may be different from that expressed by the user's gesture. In this embodiment, the arm angle of the user in the arm image is not determined, but rather, the arm angle expressed by the users gesture in the arm image is determined. Thus, an "arm angle" determined by the control unit 20 (or an arm angle determination part or device), which is described in the following description, may represent an "arm angle expressed by the user's gesture".

The control unit 20 may control the robot cleaner 1 on the basis of determined information using the arm angle determination algorithm. That is, the control unit 20 may determine a function to be performed by the robot cleaner 1 on the basis of the arm angle determined from the arm image to control the robot cleaner 1 so that the robot cleaner 1 operates in the determined function.

The control unit 20 may include an image processing part or processor 21 that divides the arm image acquired from the camera 11 into a plurality of cell images, a histogram determination part or device 22 that determines a histogram of each of the plurality of cell images, and an arm angle determination part or device 23 that determines an arm angle expressed by the user's gesture on the basis of the histogram of the cell image. Also, the control unit 20 may further include a present position determination part or device 26 that determines a present position of the robot cleaner 1, and a function execution part or device 27 that executes a function of the robot cleaner 1 on the basis of the arm angle information determined by the arm angle determination part 23.

In the foregoing descriptions, the image processing part 21, the histogram determination part 22, the arm angle determination part 23, the present position determination part 26, and the function execution part 27 are classified according to their functions. To perform the function of this embodiment, the image processing part 21, the histogram determination part 22, the arm angle determination part 23, the present position determination part 26, and the function execution part 27 may operate as at least one software module.

For example, the control unit 20 may control the movement device 30 on the basis of the arm angle information determined from the arm image. As the control unit 20 controls the movement device 30, the robot cleaner 1 may move to a predetermined position. Reference information for determining the arm angle may be stored in the memory 29. Also, map information of an area in which the robot cleaner 1 is disposed and cleaning history information may be stored in the memory 29. For example, while the robot cleaner 1 performs cleaning, information of a cleaning completion area and a cleaning incompletion area of an entire area may be divided and stored in the memory 29.

Also, the map information may include a plurality of area information divided by a wall. For example, the map information may include living room information (not limited to the living room) and at least one room information which are divided by the wall. However, the living room and the room are named for convenience of description. Thus, the map information in which the plurality of areas is divided may be stored in the memory 29. Also, present position information of the robot cleaner 1 may be stored in the memory 29.

The robot cleaner 1 may further include a voice recognition device 40. The voice recognition device 40 may be disposed in the casing 10. The voice recognition device 40 may include a voice input part or input 41, into which a voice may be input, and a voice analysis part 42 that analyzes the input voice.

For example, the voice input part 41 may be one or more microphone. The voice input part 41 may include at least three microphones so that the voice recognition device 40 may recognize a position (or a direction) at or from which a voice command is generated. For example, the position at or from which the voice command is generated (hereinafter, referred to as a "voice command generation position) may be a present position of the user.

That is, distances from voice commands to the microphones may be different from each other. Thus, times taken to transmit the voice command generated at a specific position to the microphones may be different from each other. Also, levels of sound transmitted from the specific position to the microphones may be different from each other. The position at which the voice command is generated may be determined using a difference between travel times of the same voice command detected by the microphones or the sound level detected by each of the microphones.

When the command recognized by the voice recognition device 40 is a gesture recognition command, the control unit 20 may acquire the image of the user through the camera 11 to determine the arm angle of the user. For example, when the voice recognition device 40 recognizes the gesture recognition command of the user while the robot cleaner 1 performs cleaning, the control unit 20 may stop the cleaning of the robot cleaner 1 to change a direction thereof to the voice command generation position and activate the camera 11.

When the voice recognition device 40 of the robot cleaner 1 recognizes the gesture recognition command, the camera 11 may be activated. This is done to prevent the camera 11 from being unnecessarily operated in or during a cleaning or standby process or state of the robot cleaner 1.

Also, when the robot cleaner 1 receives the gesture recognition command, the robot cleaner 1 may change its travelling direction toward the voice command generation position to activate the camera 11. This is done to accurately acquire the image of the user using the camera 11. Of course, when the robot cleaner 1 is traveling toward or in a direction in or from which the voice command is generated while performing cleaning, a separate change of direction is unnecessary.

Hereinafter, a method of controlling a robot cleaner will be described.

Figure 3:
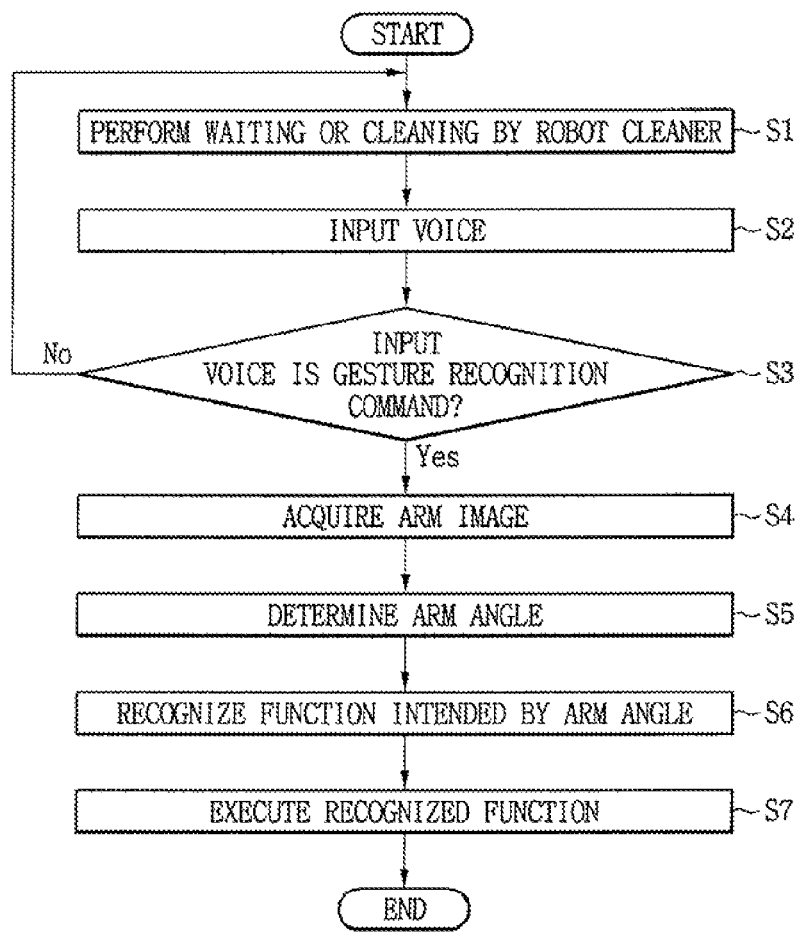
FIG. 3 is a flowchart of a method of controlling a robot cleaner according to an embodiment.
Figure 4:
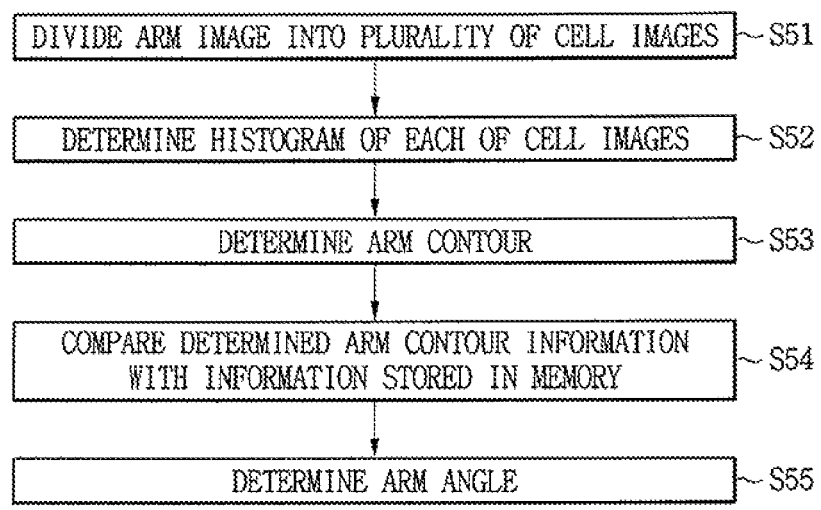
FIG. 4 is a flowchart explaining an arm angle determination algorithm shown by a user's gesture according to an embodiment.

FIG. 3 is a flowchart of a method of controlling a robot cleaner according to an embodiment. FIG. 4 is a flowchart explaining an arm angle determination algorithm shown by a user's gesture.

Figure 5:
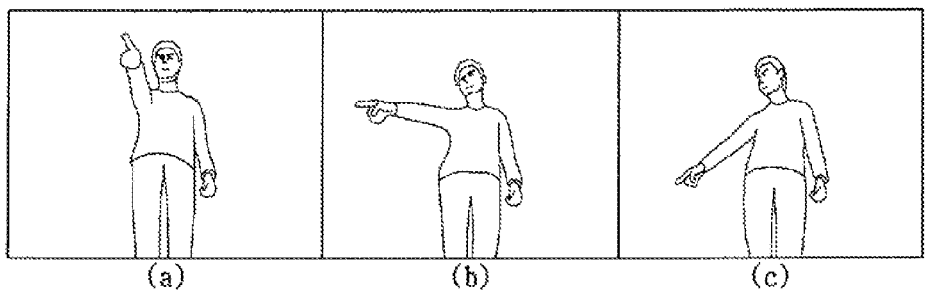
FIGS. 5 and 6 are views of an image of a user's gesture photographed by a camera.
Figure 5:
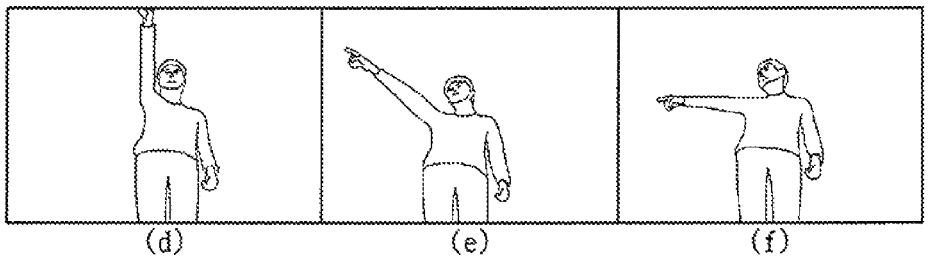
Figure 6:
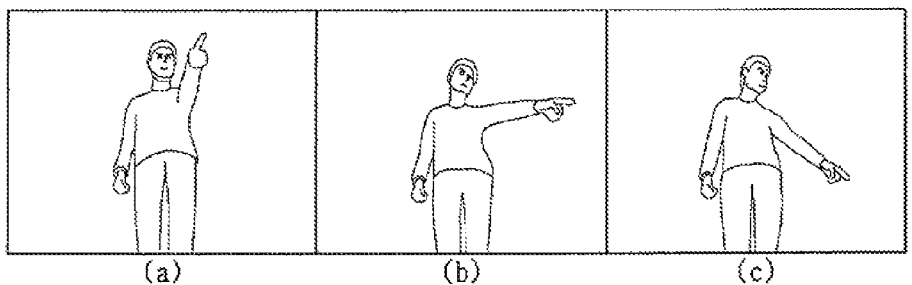
Figure 6:
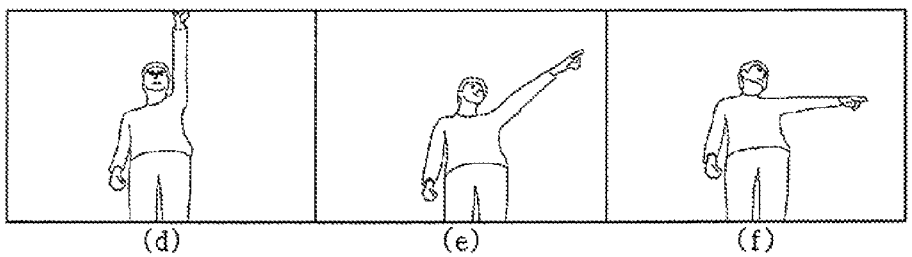

FIGS. 5 and 6 are views of an image of a user's gesture photographed by a camera, FIGS. 5a to 5c are views illustrating a case in which a right arm angle of the user is about 45 degrees, and FIGS. 5d to 5f are views illustrating a case in which the right arm angle of the user is about 90 degrees. FIGS. 6a to 6c are views illustrating a case in which a left arm angle of the user is about 45 degrees, and FIGS. 5d to 5f are views illustrating a casein which the left arm angle of the user is about 90 degrees.

Referring to FIGS. 3 to 6, in operation S1, a robot cleaner 1 may perform cleaning by in response a cleaning start command, or wait for the cleaning start command. While the robot cleaner 1 performs the cleaning or wait, the camera 11 may be maintained in a non-activated state.

Then, in operation S2, a voice command of a user may be input through the voice recognition device 40. When the voice is input through the voice input part 41, the voice analysis part 42 may extract a command intended by the input voice. Also, the voice analysis part 42 may transmit the extracted voice command to the control unit 20.

In operation S3, the control unit 20 may determine whether the voice command input through the voice recognition device 40 is a gesture recognition command. Depending on the result determined in operation S3, when it is determined that the voice command input through the voice recognition device 40 is not the gesture recognition command, the robot cleaner 1 may perform the cleaning by the cleaning start command or wait for the cleaning start command. On the other hand, when the voice command input through the voice recognition device 40 is the gesture recognition command, the control unit 10 may activate the camera 11. Then, in operation S4, the camera 11 may acquire an image including an arm of a user.

As described above, the voice recognition device 40 may recognize a voice command generation position, and when the robot cleaner 1 does not face the voice command generation position, more particularly, when the camera 11 of the robot cleaner 1 does not face the voice command generation position, the control unit 20 may control the movement device 20 so that the camera 11 of the robot cleaner 1 faces the voice command generation position. For another example, the control unit 20 may control the movement device 30 so that the robot cleaner 1 rotates about 360 degrees while remaining in a same place or location even if the voice recognition device 40 does not recognize the voice command generation position. The camera 11 may acquire the image while the robot cleaner 1 rotates about 360 degrees while remaining in the same place or location. In this case, the camera 11 may acquire a plurality of images photographed at a predetermined interval. The control unit 20 may extract the image in which the users arm is included from the acquired plurality of images.

Then, in operation S5 the control unit 20 may determine a side and angle of the arm expressed by the user's gesture in the acquired image (hereinafter, referred to as an "initial image"). In detail, in operation S51, the image processing part 22 may divide the initial image into a plurality of cell images or extract an image including the arm (hereinafter, referred to as an "arm image") from the initial image to divide the extracted arm image into a plurality of cell images. The arm image may include a face and shoulder, as well as the arm.

For example, the image processing part 22 may extract the user's face and shoulder from the initial image acquired from the camera 11 to recognize the user's arm on the basis of the extracted face and shoulder. Also, the image processing part 22 may extract the arm image from the initial image. The image processing part 22 may determine the side of the arm included in the acquired arm image on the basis of the extracted face and shoulder, that is, a left arm or a right arm.

In operation S52, the histogram determination part 22 may divide each of the cell images into a plurality of pixels to determine a histogram of each of the pixels. Then, in operation S53, the arm angle determination part 23 may determine a contour of the arm on the basis of the histogram determined through the histogram determination part 22.

In operation S54, the arm angle determination part 23 may compare the determined contour of the arm with information stored in the memory 29. Then, in operation S55, the arm angle determination part 23 may determine an arm angle expressed by the user's gesture.

In this embodiment, as the contour of the arm may be determined from the arm image on the basis of the histogram determined by the histogram determination part 22, and the determined contour of the arm and the information stored in the memory 29 may be compared with each other to determine the arm angle, a calculation and a time for extracting characteristics to determine the arm angle may be simple and short.

Hereinafter, differences between images according to a side and angle of an arm expressed by a user's gesture will be described.

Referring to FIG. 5a, when the user's gesture expresses that the right arm is directed at an angle of about 45 degrees (referred to as a "first angle") in a front direction of the user, and when the user's gesture expresses that the right arm is directed at an angle of about 90 degrees (referred to as a "second angle") in the front direction of the user, as illustrated in FIG. 5d, real angles and directions of the arm expressed by the user's gesture are different from those of the arm in the image acquired by the camera 11. Further, referring to FIG. 5b, when the user's gesture expresses that the right arm is directed at the angle of about 45 degrees in a front and right direction of the user, and when the user's gesture expresses that the right arm is directed at the angle of about 90 degrees in the front and right diagonal direction of the user, as illustrated in FIG. 5e, real angles and directions of the arm expressed by the user's gesture are different from those of the arm in the image acquired by the camera 11. Furthermore, referring to FIG. 5c, when the user's gesture expresses that the right arm is directed at the angle of about 45 degrees in a right direction of the user, and when the user's gesture expresses that the right arm is directed at the angle of about 90 degrees in the right direction of the user, as illustrated in FIG. 5f, real angles and directions of the arm expressed by the user's gesture are different from those of the arm in the image acquired by the camera 11.

Also, referring to FIG. 6a, when the user's gesture expresses that the left arm is directed at the angle of about 45 degrees in a front direction of the user, and when the user's gesture expresses that the left arm is directed at the angle of about 90 degrees in the front direction of the user, as illustrated in FIG. 6d, real angles and directions of the arm expressed by the user's gesture are different from those of the arm in the image acquired by the camera 11. Further, referring to FIG. 6b when the user's gesture expresses that the left arm is directed at the angle of about 45 degrees in a front and left diagonal direction of the user, and when the user's gesture expresses that the left arm is directed at the angle of about 90 degrees in the front and left diagonal direction of the user, as illustrated in FIG. 6e, real angles and directions of the arm expressed by the user's gesture are different from those of the arm in the image acquired by the camera 11. Furthermore, referring to FIG. 6c, when the user's gesture expresses that the left arm is directed at the angle of about 45 degrees in a left direction of the user, and when the user's gesture expresses that the left arm is directed at the angle of about 90 degrees in the left direction of the user, as illustrated in FIG. 6f, real angles and directions of the arm expressed by the user's gesture are different from those of the arm in the image acquired by the camera 11.

In this way, the arm angle expressed by the user's gesture is different from the real arm angle in the image acquired by the camera. Thus, to accurately determine the arm angle expressed by the user's gesture from the arm image, reference information corresponding to gestures in cases of FIGS. 5a to 5f and FIGS. 6a to 6f are stored in the memory 29. Although the reference information is not limited, the reference information may be arm contour information corresponding to each of the gestures.

For example, as the contours of the arm in the arm images are different from each other for each gesture of FIGS. 5a to 5f and FIGS. 6a to 6f and have a predetermined pattern, only the contour for each gesture may be stored in the memory 29. Thus, information stored in the memory 29 may be reduced, and thus, a process for comparing the contours with each other while the arm angle is determined may be simplified. Also, it may take a short time to compare the contours with each other.

The arm angle determination part 23 may determine whether the arm contour information determined from the image acquired by the camera 11 is the same as one of the gestures illustrated in FIGS. 5 and 6. That is, the arm angle determination part 23 may determine whether the determined arm contour information coincides with one pattern of the plurality of reference information divided and stored for each gesture.

Referring to FIGS. 5*b* and 5*f*, the contour and direction of the arm determined from the image acquired by the camera 11 when the user's gesture expresses that the right arm is directed in the front direction of the user and at the angle of about 45 degrees in the right diagonal direction are similar to those of the arm determined from the image acquired by the camera 11 when the user's gesture expresses that the right arm is directed at the angle of about 90 degrees at the right side of the user. Also, referring to FIGS. 6*b* and 6*f*, the contour and direction of the arm determined from the image acquired by the camera 11 when the user's gesture expresses that the left arm is directed at the angle of about 45 degrees in the front and left diagonal direction are similar to those of the arm determined from the image acquired by the camera 11 when the user's gesture expresses that the left arm is directed at the angle of about 90 degrees in the left direction of the user. Thus, when the arm angle determination part 23 determines that the determined arm contour information coincides with at least two patterns of the plurality of reference information divided and stored for each gesture, the arm angle determination part 23 may determine a direction in which the user's face faces in the image acquired by the camera 11 to finally determine the arm angle expressed by the user's gesture.

For example, as illustrated in FIGS. 5*b* and 6*b*, when the arm angle of the user is disposed at the angle of about 45 degrees, generally, the user's face may face a direction in which the user's arm points. That is, the user's eyes are turned toward the direction in which the arm is directed at the angle of about 45 degrees. The user may turn his neck at a predetermined angle so that the user's eyes are turned toward the angle of about 45 degrees. In this case, the user's face does not look forward but looks downward while looking in the diagonal direction. On the other hand, when the user's arm is directed at the angle of about 90 degrees in the right or left direction, as illustrated in FIG. 5*f* or 6*f*, the user's face generally looks forward or looks at the right or left side in a state in which the user's head is not bowed downward. As a result, the direction of the user's face may change according to the arm angle expressed by the user's gesture.

Thus, in this embodiment, the arm angle determination part 23 may determine the direction of the user's face in the image acquired by the camera 11 to finally determine the arm angle included in the user's gesture. Of course, information regarding the direction of the user's face may be stored in the memory 29 for each gesture.

As described above, when the side and angle of the arm expressed by the user's gesture are determined, in operation S6, the control unit 20 may recognize a function intended by the arm angle. Then, in operation S7, the control unit 20 may control that the robot cleaner 1 to execute the recognized function. For example, the function execution part 27 may recognize the function intended by the arm angle expressed by the user's gesture to control the movement device 30 so that the robot cleaner 1 executes the recognized function.

Figure 7:
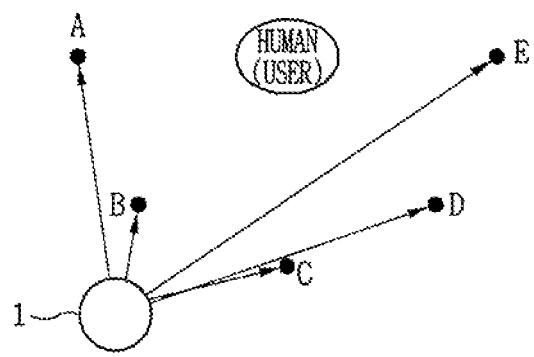
FIG. 7 is a view illustrating a state in which the robot cleaner moves when a user's gesture expresses an arm angle of about 45 degrees.

FIG. 7 is a view illustrating a state in which the robot cleaner moves when a user's gesture expresses an arm angle of about 45 degrees. Referring to FIG. 7, in this embodiment, when the arm angle expressed by the user's gesture is about 45 degrees, for example, it may signify a command in which the robot cleaner moves toward the user to a position in the direction in which the user's arm points.

The robot cleaner 1 may determine the present position by the present position determination part 26 and recognize the voice command generation position by the voice recognition device 40. Thus, the robot cleaner 1 may move in the direction intended by the user. For example, the robot cleaner 1 may determine the present position thereof and the voice command generation position on the map to determine a position spaced a predetermined distance from the user in a direction expressed by the user's gesture from the voice command generation position as a target position, thereby moving to the determined target position.

Position A in FIG. 7 is a target position when the user's gesture expresses that the user's right arm is directed at the angle of about 45 degrees in the right direction of the user, as illustrated in FIG. 5*c*. Position B in FIG. 7 is a target position when the user's gesture expresses that the user's right arm is directed at the angle of about 45 degrees in the front and right diagonal direction of the user, as illustrated in FIG. 5*b*. Position C in FIG. 7 is a target position when the user's gesture expresses that the user's right or left arm is directed at the angle of about 45 degrees in front of the user, as illustrated in FIGS. 5*a* and 6*a*. Position D in FIG. 7 is a target position when the user's gesture expresses that the user's left arm is directed at the angle of about 45 degrees in the front and left diagonal direction of the user, as illustrated in FIG. 6*b*. Position E in FIG. 7 is a target position when the user's gesture expresses that the user's left arm is directed at the angle of about 45 degrees in the left direction of the user, as illustrated in FIG. 6*c*.

Figure 8:
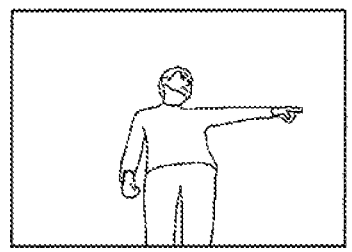
FIG. 8 is a view illustrating a state in which the robot cleaner moves when a user's gesture expresses an arm angle of about 90 degrees.
Figure 8:
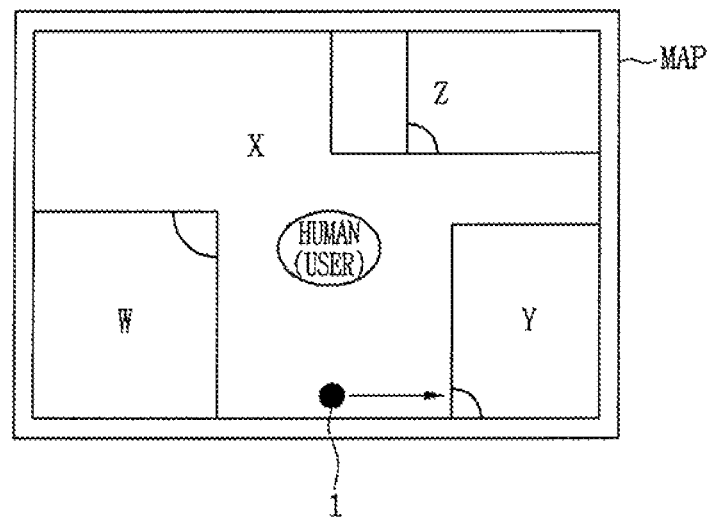

FIG. 8 is a view illustrating a state in which the robot cleaner moves when the user's gesture expresses an arm angle of about 90 degrees. Referring to FIG. 8, map information, in which a plurality of areas is divided, and the present position information on the map of the robot cleaner 1 may be stored in the memory 29. Then, when the gesture recognition command is input in the voice recognition device 40, the voice recognition device 40 may recognize the voice command generation position.

In this embodiment, when the arm angle of the user expressed by the user's gesture is about 90 degrees, for example, it may signify a command in which the robot cleaner moves to an area defined in a direction in which the user's arm points. For example, as illustrated in FIG. 8, a plurality of areas W, X, Y, and Z may be stored in the map information of the memory 29. The voice command generation position and the present position of the robot cleaner may be determined.

For example, when the robot cleaner 1 is currently disposed on an area X, and the user's gesture expresses that the left arm is directed at an angle of about 90 degrees in the left direction of the user, the robot cleaner 1 may recognize an area Y existing at the right side thereof as an area to which the robot cleaner 1 itself moves. Then, the robot cleaner 1 may move to the area Y. As the robot cleaner knows coordinate information of the present position thereof and coordinate information of the area Y, the robot cleaner 1 may know a coordinate of a center of the area Y to move to the center of the area Y.

According to this embodiment, a calculation and time for extracting characteristics to determine the arm angle may be simple and short. Also, even though a camera capable of photographing a black and white image may be used instead of a stereo camera, the command expressed by the user's gesture may be determined to reduce costs of the robot cleaner.

Further, as characteristics for determining the arm angle may be extracted from the arm image of the user acquired by the camera and may be compared with the information stored in the memory, characteristics of the arm angle may be extracted from an image of low quality. Furthermore, as characteristics of the arm angle may be extracted from a single image, but not extracted from a sequence image (information), in real time, a calculation speed may be fast, and extraction accuracy of the arm angle characteristics may be improved.

In the above embodiments, for example, the angle and direction of the arm expressed by the users gesture may be determined from the arm image, and the intention expressed by the determined arm angle may be determined to control the movement device. However, all of components that are variable in operation may be controlled. For example, a suction motor may be stopped in operation or be variable in output force according to the intention expressed by the arm angle.

Thus, an object that is controlled according to the intention expressed by the arm angle may be called the driving component or device. Therefore, the driving component may include at least one of the movement device and the suction motor.

Also, in this embodiment, a computer readable recording medium in which a computer program capable of executing the method of recognizing the gesture by the computer is recorded, may be provided. The recording medium may include a program command, a data file, and a data structure, which may be independently provided or combined with each other. This embodiment may be implemented as a computer program product including a machine-accessible medium having a built-in command capable of being used to program a processing system or other electronic devices. Such a recording medium may be a machine-readable transmission medium or recordable medium including a magnetic medium, an optical medium, or other appropriate medium. The recording medium may include program commands for executing the arm angle determination algorithm. The program command may be used to generate a general system programmed with the commands for executing the operations described in the present application or a processing system for a specific purpose.

In the above embodiments, although the component or device for recognizing the gesture is disposed in the robot cleaner, alternatively, the component of device for recognizing the gesture may be disposed in other home appliances. Also, the device for recognizing the gesture may be provided as a separate module, and thus, be independently used. For example, after the device for recognizing the gesture may recognize the users gesture, the robot cleaner may receive the command expressed by the gesture from the device for recognizing the gesture to execute the command expressed by the users gesture.

Embodiments disclosed herein provide a robot cleaner and a method for controlling a robot cleaner.

Embodiments disclosed herein provide a robot cleaner that may include a casing; a driving component or device disposed in the casing; a camera disposed in the casing to acquire an image including a user's gesture; and a control unit a controller that extracts an image including a user's arm image from the image acquired by the camera to determine an angle and direction of the arm expressed by the user's gesture from the arm image and determine an intension expressed by the determined arm angle, thereby controlling the driving component.

Embodiments disclosed herein provide a method for controlling a robot cleaner that may include inputting a voice command through a voice recognition device disposed in the robot cleaner; determining whether the input voice command is a gesture recognition command by a control unit or controller; acquiring an image including a user's gesture by a camera, when the input voice command is the gesture recognition command; determining an angle and direction of an arm expressed by the user's gesture from the image acquired from the camera by the control unit; and determining a function intended by the determined arm angle to control a movement device by the control unit so as to execute the determined function.

The details of one or more embodiments are set forth in the accompanying drawings and the description. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner, comprising:
   a casing;
   a drive disposed in the casing;
   a camera disposed in the casing to acquire an image of a gesture of a user; and
   a controller that extracts an image of an arm of the user from the image acquired by the camera to determine an angle and direction of the arm expressed by the gesture from the image of the arm and determine an intension expressed by the determined angle of the arm, and controls the drive based on the determined intension, wherein the controller comprises:
an image processor that divides the arm image into a plurality of cell images;
a histogram determination device that determines a histogram of each of the plurality of cell images; and
an arm angle determination device that determines the arm angle expressed by the gesture on the basis of the histograms of the plurality of cell images.

2. The robot cleaner according to claim 1, wherein the drive comprises at least one of a movement device to move the casing or a suction motor to generate a suction force.

3. The robot cleaner according to claim 2, further comprising a voice recognition device disposed in the casing to recognize a voice command of the user, wherein, when the controller determines that the voice command recognized by the voice recognition device is a gesture recognition command, the controller controls the camera so that the camera acquires the image of the gesture.

4. The robot cleaner according to claim 3, wherein, when the controller determines that the voice command recognized by the voice recognition device is the gesture recognition command, the controller activates the camera, which is in a non-activated state.

5. The robot cleaner according to claim 3, wherein the voice recognition device determines a position at which the voice command is generated, and when the controller determines that the voice command recognized by the voice recognition device is the gesture recognition command, the controller controls the movement device so that the camera faces the position.

6. The robot cleaner according to claim 3, wherein, when the controller determines that the voice command recognized by the voice recognition device is the gesture recognition command, the controller controls the movement device so that the casing rotates within a range of a predetermined angle, and the camera acquires a plurality of images while the casing rotates.

7. The robot cleaner according to claim 3, wherein, when the controller determines the arm angle expressed by the gesture is a predetermined angle, the controller controls the movement device so that the casing moves to a position in a direction in which the arm points.

8. The robot cleaner according to claim 7, wherein the controller determines a present position and a user's position to control the movement device so that the casing moves to a position which is spaced a predetermined distance from the user in the direction in which the arm points.

9. The robot cleaner according to claim 2, wherein, when the controller determines the arm angle expressed by the gesture is a predetermined angle, the controller controls the movement device so that the casing moves to an area defined in a direction in which the arm points.

10. The robot cleaner according to claim 9, further comprising a memory in which map information is stored, wherein the map information comprises a plurality of divided areas, and wherein the controller controls the movement device so that the casing moves from a present area to an area of the plurality of areas, which is defined in the direction in which the arm points.

11. The robot cleaner according to claim 2, wherein the controller changes an output of the suction motor according to the arm angle expressed by the gesture.

12. The robot cleaner according to claim 1, wherein the image processor extracts the image of the arm with respect to a face and shoulder of the user from the image acquired by the camera.

13. The robot cleaner according to claim 1, further comprising a memory in which reference information used to determine the arm angle is stored, wherein the arm angle determination device determines a contour of the arm on the basis of the histogram determined through the histogram determination device to compare the determined arm contour information with the information stored in the memory, thereby determining the arm angle expressed by the gesture.

14. The robot cleaner according to claim 13, wherein a plurality of reference information is divided and stored for each angle and a direction of the arm expressed by the gesture in the memory.

15. The robot cleaner according to claim 14, wherein, when the arm angle determination device determines that the determined arm contour information coincides with patterns of at least two of the plurality of reference information, the arm angle determination device determines a direction in which the face of the user faces from the image acquired by the camera to determine the arm angle expressed by the gesture on the basis of the determined direction.

16. A robot cleaner, comprising:
a casing;
a drive disposed in the casing;
a camera disposed in the casing to acquire an image of a gesture of a user;
a controller that extracts an image of an arm of the user from the image acquired by the camera to determine an angle and direction of the arm expressed by the gesture from the image of the arm and determine an intended function expressed by the determined arm angle, and controls the drive to execute the determined function; and
a voice recognition device disposed in the casing to recognize a voice command of the user, wherein, when the controller determines that the voice command recognized by the voice recognition device is a gesture recognition command, the controller controls the camera so that the camera acquires the image of the gesture, wherein the controller comprises:
an image processor that divides the image of the arm into a plurality of cell images;
a histogram determination device that determines a histogram of each of the plurality of cell images; and
an arm angle determination device that determines an arm angle expressed by the gesture on the basis of the histogram of the plurality of cell images.

17. The robot cleaner according to claim 16, wherein the voice recognition device determines a position at which the voice command is generated, and when the controller determines that the voice command recognized by the voice recognition device is the gesture recognition command, the controller controls the robot cleaner so that the camera faces the position.

18. The robot cleaner according to claim 16, wherein, when the controller determines that the voice command recognized by the voice recognition device is the gesture recognition command, the controller controls the robot cleaner so that the casing rotates within a range of a predetermined angle, and the camera acquires a plurality of images while the casing rotates.

19. The robot cleaner according to claim 16, wherein the image processor extracts the image of the arm image with respect to a user's face and shoulder from the image acquired by the camera.

20. The robot cleaner according to claim 16, further comprising a memory in which reference information used to determine the arm angle is stored, wherein the arm angle determination device determines a contour of the arm on the basis of the histogram determined through the histogram determination device to compare the determined arm contour information with the information stored in the memory, thereby determining an arm angle expressed by the user's gesture.

\* \* \* \* \*